(12) United States Patent
Aydin et al.

(10) Patent No.: US 9,195,951 B2
(45) Date of Patent: Nov. 24, 2015

(54) DISPLAYING A VISUALIZATION OF A PORTION OF A ROLLING HORIZON TIME SERIES

(75) Inventors: Burcu Aydin, Mountain View, CA (US); Kemal Guler, San Jose, CA (US); Mehmet Oguz Sayal, Sunnyvale, CA (US); Enis Kayis, East Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 846 days.

(21) Appl. No.: 13/284,570

(22) Filed: Oct. 28, 2011

(65) Prior Publication Data

US 2013/0111389 A1   May 2, 2013

(51) Int. Cl.
  *G06F 3/048*    (2013.01)
  *G06Q 10/04*    (2012.01)
  *G06T 11/20*    (2006.01)
  *G06Q 10/06*    (2012.01)

(52) U.S. Cl.
  CPC .............. *G06Q 10/04* (2013.01); *G06F 3/048* (2013.01); *G06Q 10/06375* (2013.01); *G06T 11/206* (2013.01)

(58) Field of Classification Search
  CPC ........................................... G06F 3/048
  USPC ............................................ 715/772
  See application file for complete search history.

(56) References Cited

U.S. PATENT DOCUMENTS

| | | | |
|---|---|---|---|
| 7,103,562 B2 | 9/2006 | Kosiba et al. | |
| 7,423,582 B2 | 9/2008 | Holderle et al. | |
| 2010/0287146 A1* | 11/2010 | Skelton et al. | 707/705 |
| 2011/0054973 A1* | 3/2011 | Deich et al. | 705/8 |

FOREIGN PATENT DOCUMENTS

WO    WO-2010138864    12/2010

OTHER PUBLICATIONS

Ladstadter et al.: "Exploration of Climate Data Using Interactive Visualization", 2010, American Meteorological Society, Apr. 2010, pp. 667-679.

* cited by examiner

*Primary Examiner* — Andrea Leggett
(74) *Attorney, Agent, or Firm* — Trop, Pruner & Hu, P.C.

(57) ABSTRACT

A method performed by a processing system displays a graph of a portion of a rolling horizon time series corresponding to a realization of a realization time series adjacent to a graph of the realization time series.

23 Claims, 8 Drawing Sheets

DISPLAYING A VISUALIZATION OF A PORTION OF A ROLLING HORIZON TIME SERIES

BACKGROUND

Business information, such as forecasting information, is often stored in complex formats such as a rolling horizon time series. The complex nature of these formats can make the information difficult for a user to analyze and understand. Further, the volume of information stored may be too large for a user to consider in any given time frame. Techniques that provide insights into complex and voluminous information may be valuable for a user.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, a rolling horizon time series visualization environment is provided for interactively visualizing portions of one or more rolling horizon time series with respect to a realization time series. The environment provides a user with the ability to select portions of one or more rolling horizon time series for visualization (e.g., graphical display) adjacent to a visualization of a realization time series according to a selected visualization format. Each visualized portion may represent a set of forecasts corresponding to the same time period as a given realization or a forecast time series with forecasts corresponding to different time periods than a time period of a given realization. The user may select an aggregation level and time granularity of the realization time series for display as well as a horizon length of the displayed portion of the rolling horizon time series. The visualizations allow the user to interactively understand relationships between one or more rolling horizon time series and a realization time series.

As used herein, a time series refers to a sequence of data points indexed by time, where each interval of time in the time series is referred to as a time period. A time series includes a data point for each time period of the time series. The number of time periods included in a time series is referred to as the horizon length (e.g., a horizon length may include 3 time periods). A rolling horizon time series includes at least two time series with the same horizon length but different sets of overlapping time periods.

As used herein, a forecast time series refers to a sequence of forecast data points (referred to herein as forecasts) indexed by time. Each forecast represents an amount of a forecast variable (i.e., a unit) that is predicted to be realized for a given time period. A forecast rolling horizon time series includes at least two forecast time series with the same horizon length but different sets of overlapping time periods.

As used herein, a realization time series refers to a sequence of realization data points (referred to herein as realizations) indexed by time. Each realization represents an amount of a realization variable (i.e., a unit) that is actually realized.

Rolling horizon time series may be used in forecasting processes, such as procurement forecasting processes involving a buyer and seller. By nature, forecasting processes generally involve an amount of error that is desirable to be minimized each time that forecasts are issued. In order to minimize the error, a user often seeks to gain understanding and insights into the type and amount of error in previous forecasts when compared to realizations. The interactive rolling horizon time series visualizations described herein may advantageously allow a user to analyze forecasts and realizations at selectable or aggregate points in a forecasting process.

Figure 1:
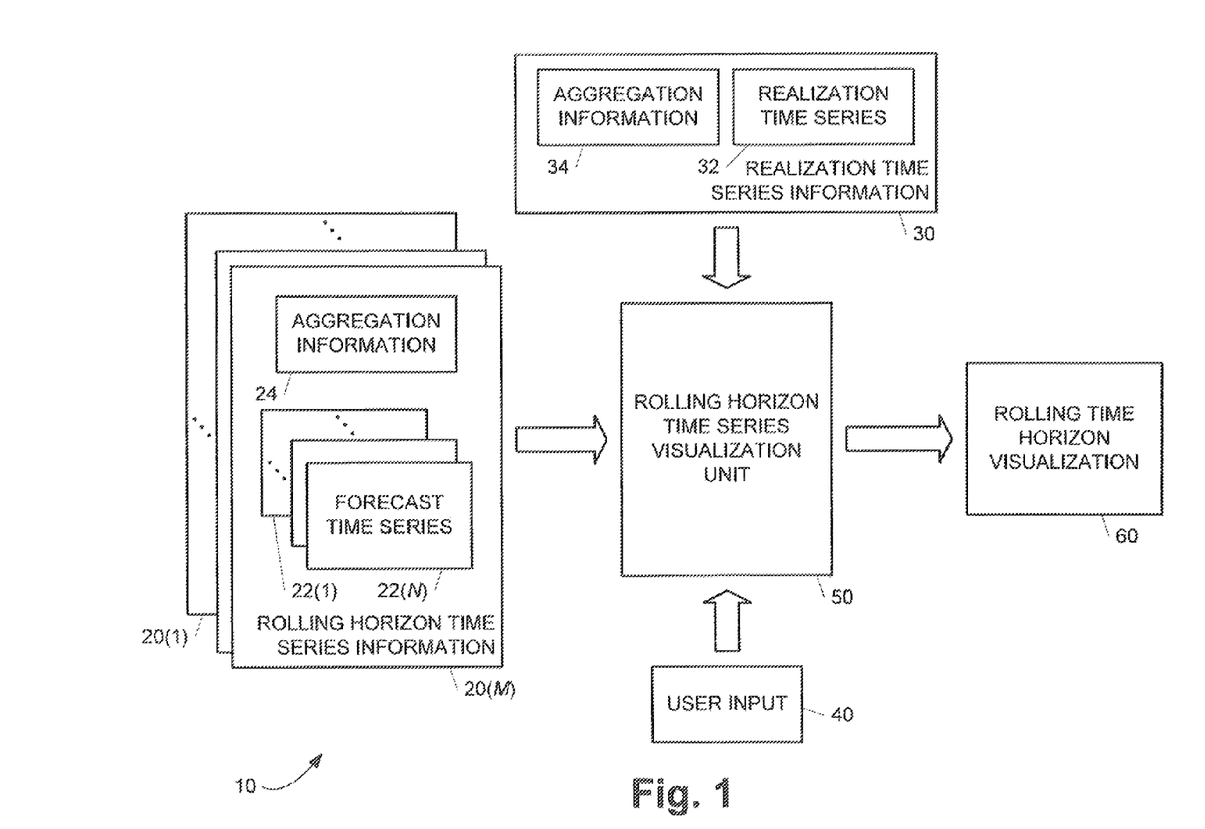
FIG. 1 is a block diagram illustrating one embodiment of a rolling horizon time series visualization environment for providing a rolling horizon time series visualization.

FIG. 1 is a block diagram illustrating one embodiment of rolling horizon time series visualization environment 10 for providing a rolling horizon time series visualizations 60. Visualization environment 10 includes a set of forecast rolling horizon time series information 20(1)-20(M) (where M is an integer that is greater than or equal to one), realization time series information 30, and user inputs 40 that are provided to a rolling horizon time series visualization unit 50 (hereafter visualization unit 50) to generate rolling horizon time series visualizations 60. Visualization environment 10 allows a user that provides user inputs 40 to interactively select portions of one or more of rolling horizon time series information 20(1)-20(M) for visualization with respect to a visualization of realization time series 30 according to a selected visualization format. The rolling horizon time series visualizations 60 of visualization environment 10 include an ability for the user to select the portions of the one or more of rolling horizon time series information 20(1)-20(M) for graphical display adjacent to a graphical display of a realization time series 30 for selected or all realizations in realization time series 30. The graphical displays allow the user to interactively visualize relationships between one or more of rolling horizon time series information 20 and realization time series 30. Visualization environment 10 may be implemented using one or more processing systems (e.g., a processing system 200 shown in FIG. 7 and described in additional detail below).

Each set of rolling horizon time series information 20 includes a set of at least two forecast time series 22(1)-22(N) (where N is an integer that is greater than or equal to two) and aggregation information 24 that identifies aggregation levels (i.e., categories and/or sub-categories of information in forecast time series 22(1)-22(N)). Forecast time series 22(1)-22(N) collectively form a rolling horizon time series that covers Z time periods (where Z is an integer that is greater than or equal to three). Each forecast time series 22 includes a sequence of forecasts that span each time period in a horizon length P (i.e., P time periods) (where P is an integer that is greater than or equal to one and is less than Z). Thus, each forecast time series 22 includes a set of forecasts $\{f_{t,\,t+1}, f_{t,\,t+2}, \ldots, f_{t,\,t+P}\}$ where $f_{t,\,t+k}$ represents a forecast issued at time period t predicting an amount at time period t+k. In each time series 22 (except for the first time series 22 in the set), the first P−1 forecasts (i.e., forecasts $f_{t,\,t+1}$ to $f_{t,\,t+P-1}$) represent updates to the existing forecasts made in previous time periods and the last forecast, $f_{t,\,t+P}$, represents the first forecast issued for the time period t+P.

Figure 2A:
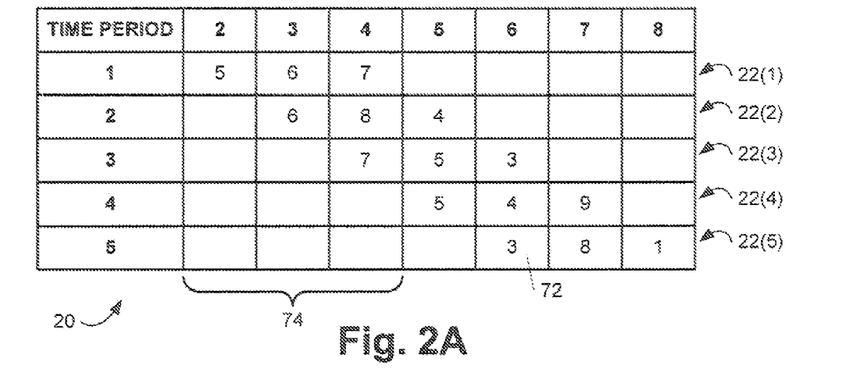
FIGS. 2A-2B are block diagrams illustrating examples of a rolling horizon time series.

FIG. 2A is a block diagram illustrating an example of rolling horizon time series information 20 with a set of forecast time series 22(1)-22(5) issued at time periods 1 through 5, respectively, and represented as rows in the diagram. Each forecast time series 22(1)-22(5) has a horizon length of 3 (i.e., P=3) such that each forecast time series 22(1)-22(5) includes 3 forecasts 72 as indicated by a bracket 74 for the horizon length of forecast time series 22(1) which spans three columns in the diagram. Thus, forecast time series 22(1) includes forecasts 72 for time periods 2-4, and forecast time series 22(2) includes forecasts 72 for time periods 3-5, etc. Collectively, forecast time series 22(1)-22(5) form a rolling horizon time series that covers 7 time periods (i.e., Z=7).

Figure 2B:
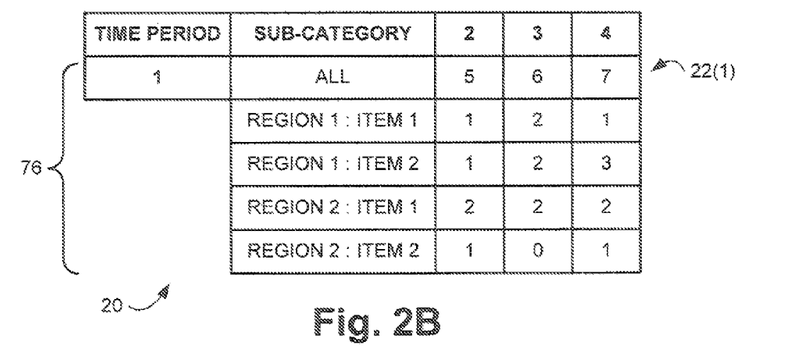

Each forecast time series 22 may include one or more aggregation levels 76 that are described by aggregation information 24 as illustrated by an example in FIG. 2B. FIG. 2B illustrates a breakdown of forecast time series 22(1) into aggregation levels 76. Each aggregation level 76 represents a category or a sub-category in a forecast time series 22(1) that breaks down the overall forecast amount into forecast amounts for the category or sub-category. In the example of FIG. 2B, aggregation levels 76 include an overall category (i.e., ALL), a first level of subcategories (i.e., REGION 1 and REGION 2), and a second level of sub-categories (i.e., ITEM 1 and ITEM 2). The aggregate of the forecast amounts for each sub-category is equal to the forecast amount for the overall category for each time period (e.g., for time period 3, the sum of all items across all regions is equal to 6). Aggregation levels 76 allow a user to select a desired portion of forecast time series 22(1) to be viewed. The desired portion may cover the overall category, a sub-category, or any aggregation of sub-categories at the same and/or different levels (e.g., the aggregation of ITEM 1 in REGION 2 and ITEM 2 in REGION 1).

Figure 3:
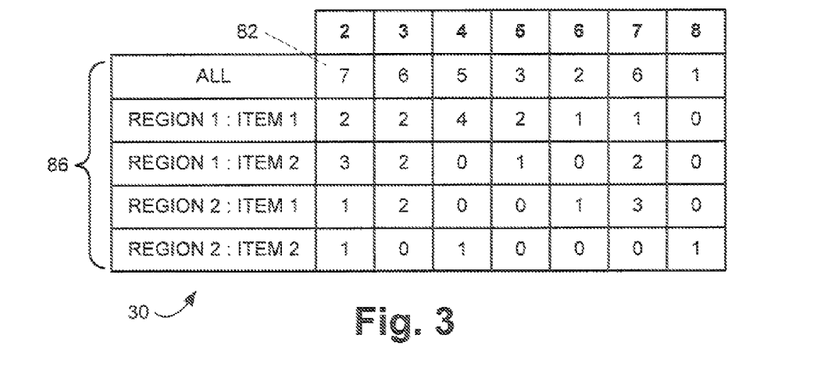
FIG. 3 is a block diagram illustrating an example of a realization time series.

Referring back to FIG. 1, realization time series information 30 includes a realization time series 32 and aggregation information 34. Realization time series 32 includes a realization for each time period, where each realization may be broken down into one or more aggregation levels described by aggregation information 34. FIG. 3 is a block diagram illustrating an example of a realization time series 30 that corresponds to the example of forecast time series 22(1)-22(5) shown in FIGS. 2A-2B.

In the example of FIG. 3, realization time series 32 includes realizations 82 for each aggregation level 86, as represented by the rows in the diagram, for time periods 2 through 8 (i.e., Z=7), as represented by the columns in the diagram. Each aggregation level 86 represents a category or a sub-category in realization time series 32 that breaks down the overall realization amount into realization amounts for the category or sub-category. Aggregation levels 86 correspond to aggregation levels 76 for forecast time series 22 (shown in FIG. 2B), and the aggregate of the realization amounts for each sub-category is equal to the realization amount for the overall category for each time period (e.g., for time period 3, the sum of all items across all regions is equal to 6). As with aggregation levels 76, aggregation levels 86 allow a user to select, a desired portion of realization time series 32 to be viewed. The desired portion may cover the overall category, a sub-category, or any aggregation of sub-categories at the same and/or different levels (e.g., the aggregation of ITEM 1 in REGION 2 and ITEM 2 in REGION 1).

User input 40 represents various types of inputs provided by a user to interactively select visualizations of rolling horizon time series information 20(1)-20(M) and realization time series information 30. User input 40 may select which rolling horizon time series information 20(1)-20(M) to visualize as well as an aggregation level and/or time granularity of selected rolling horizon time series information 20(1)-20(M) and realization time series information 30. User input 40 may also select a horizon length used in visualizations of rolling horizon time series information 20(1)-20(M). User input 40 may further select a visualization format for viewing relationships between rolling horizon time series information 20(1)-20(M) and realization time series information 30. The format may include selecting a realization for viewing visualizations of portions of one or more of rolling horizon time series information 20 with respect to realization time series 32 as will be described in additional detail below with reference to FIGS. 5A-5C. The format may also include selecting to view visualizations of numerous portions of rolling horizon time series information 20 simultaneously with respect to realization time series 32 as will be described in additional detail below with reference to FIGS. 6A-6B.

Visualization unit 50 generates rolling horizon time series visualizations 60 based on rolling horizon time series information 20(1)-20(M), realization time series information 30, and user inputs 40. Visualization unit 50 may provide an indication of the available rolling horizon time series information 20(1)-20(M) to a user to allow the user to select the desired rolling horizon time series information 20(1)-20(M) for the visualization. Visualization unit 50 correlates the time periods in the selected rolling horizon time series information 20(1)-20(M) and realization time series information 30. Visualization unit 50 may provide an indication of time granularity levels (e.g., weeks, months, quarters, years, etc.) of the realization time series 32 to a user to allow the user to select a desired time granularity for the visualizations. Visualization unit 50 also correlates the aggregation levels in the selected rolling horizon time series information 20(1)-20(M) and realization time series information 30 using aggregation information 24 and aggregation information 34. Visualization-unit 50 may provide an indication of the available aggregation levels of the realization time series 32 to a user to allow the user to select a desired aggregation level for the visualizations. Visualization unit 50 determines the horizon lengths in the selected rolling horizon time series information 20(1)-20(M) and may provide an indication of the duration of horizon lengths to a user to allow the user to select desired horizon lengths of the selected rolling horizon, time series information 20(1)-20(M) for the visualizations. Visualization unit 50 further provide an indication of type of visualization formats to a user to allow the user to select desired visualization formats of the selected rolling horizon time series information 20(1)-20(M) for the visualizations.

Based on user input 40, visualization unit 50 generates rolling horizon time series visualizations 60 to include realization time series 32 with a selected time granularity and aggregation level. Visualization unit 50 further generates rolling horizon time series visualizations 60 to include the user selected portions of one or more rolling horizon time series 20. Visualization unit 50 interactively updates rolling horizon time series visualizations 60 based on subsequent user inputs 40.

Figure 4A:
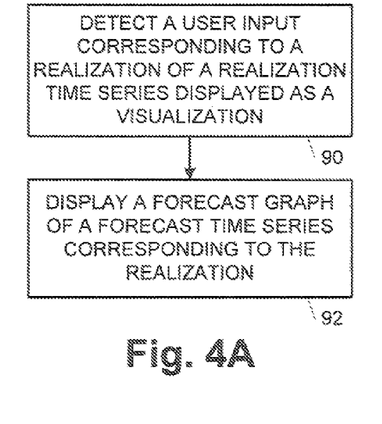
FIGS. 4A-4B are flowcharts illustrating embodiments of methods for displaying rolling horizon time series visualizations.
Figure 4B:
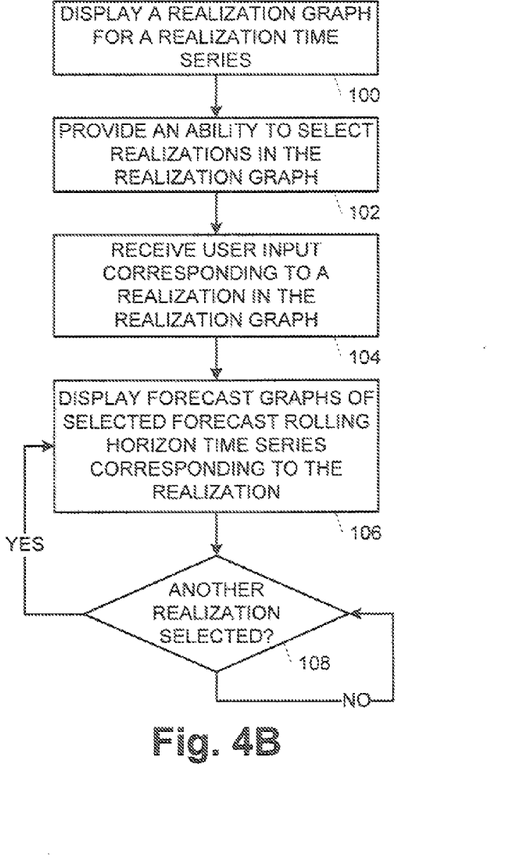

FIGS. 4A-4B are flowcharts illustrating embodiments of methods for displaying rolling horizon time series visualizations 60. The methods of FIGS. 4A-4B will be described with respect to visualization unit 50 (shown in FIG. 1) and FIGS. 5A-5C, which are graphical diagrams illustrating embodiments of rolling horizon time series visualizations, according to one embodiment.

Figure 5A:
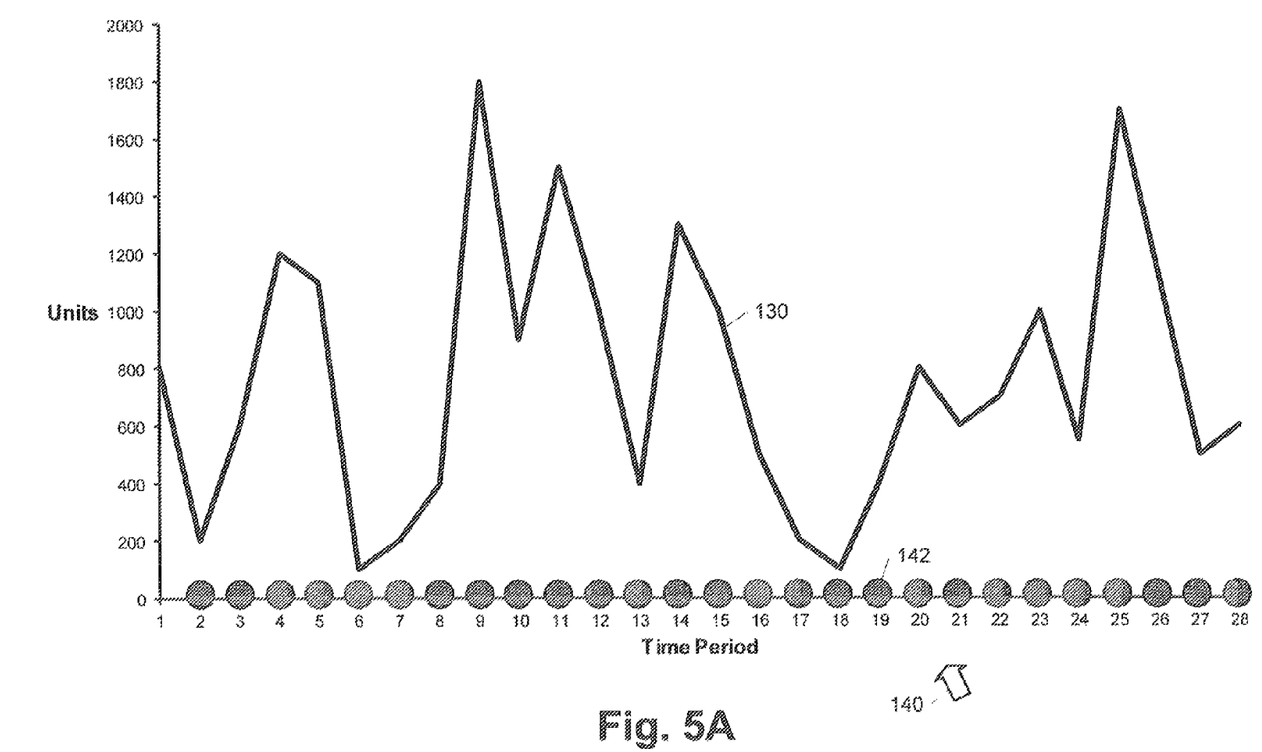
FIGS. 5A-5C are graphical diagrams illustrating embodiments of rolling horizon time series visualizations.

In the embodiment of FIG. 4A, visualization unit 50 detects a user input 40 corresponding to a realization of realization time series 30 displayed in a first visualization 60 as indicated in a block 90. FIG. 5A illustrates a visualization 60 that includes a graph 130 of realization time series 30 where the x-axis represents time periods and the y-axis represents units (i.e., forecast variables). Graph 130 connects sequential realizations of realization time series 30 across the displayed time periods. Visualization unit 50 generates graph 130 in accordance with user inputs 40, default settings, and/or other predefined settings that select the aggregation level and time granularity of realization time series 30.

In the embodiment of FIG. 5A, a user provides a user input 40 by positioning a pointer 140 and/or providing a selection input. Pointer 140 may be controlled by a mouse, a touchpad, buttons, and/or any other suitable input device. A selection input may be made by positioning the pointer on a defined area, clicking a mouse, tapping a touchpad, pushing a button, and/or performing any other suitable function that indicates a selection. In other embodiments, a user provides a user input 40 in other suitable ways.

To select a realization in the embodiment of FIG. 5A, the user positions pointer 140 over a defined area. In one embodiment, the defined area is an area in proximity to the time period on the x-axis corresponding to each realization as indicated by circles 142. In another embodiment, the defined area is an area in proximity to the realization on graph 130. In other embodiments, the defined area may be located in other suitable places and/or other methods of selecting a realization may be used.

Figure 5B:
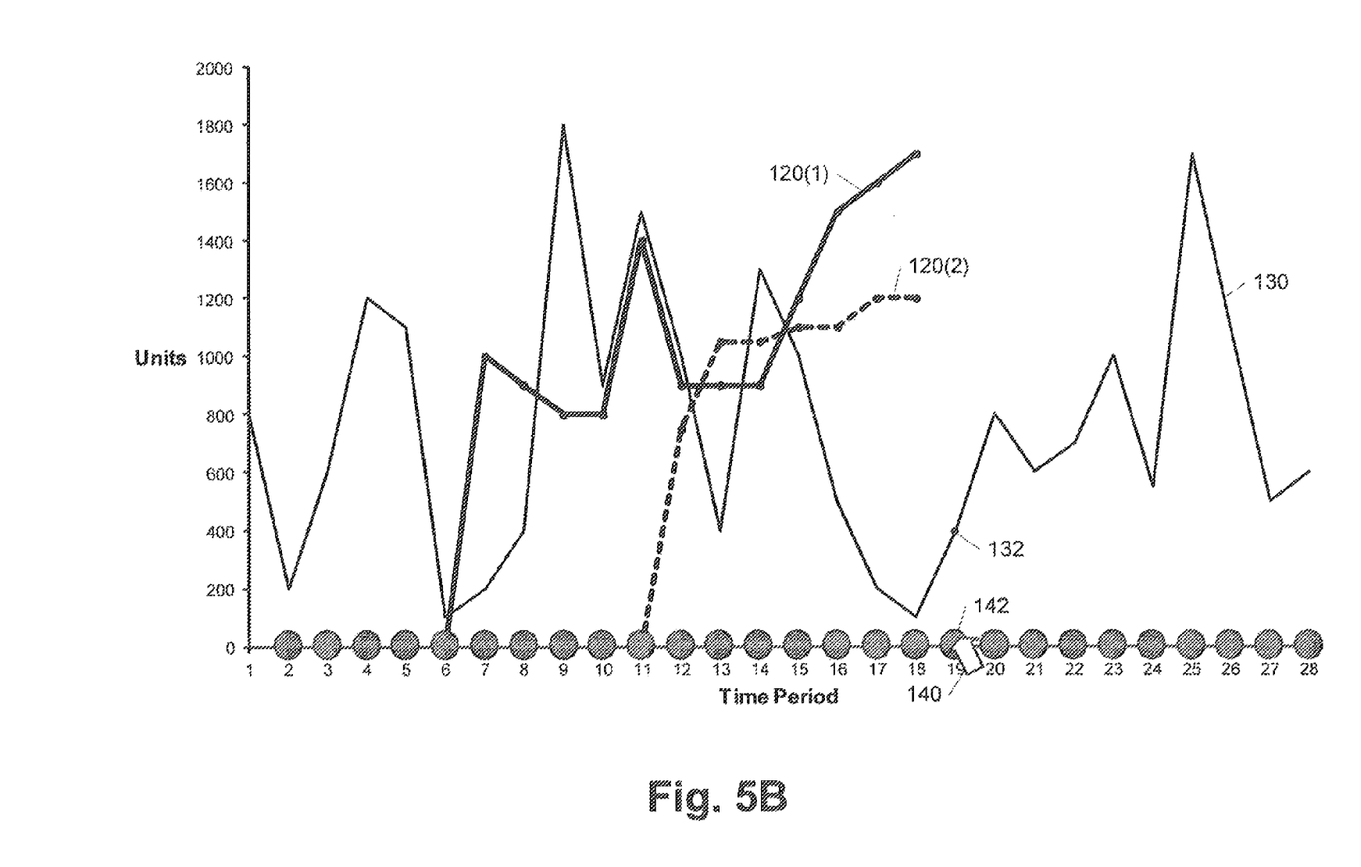

As shown in FIG. 5B, the user selects a realization 132 corresponding to time period 19 by positioning pointer 140 over the circle 142 near time period 19 on the x-axis in one embodiment. The selection causes realization 132 to be visually highlighted on graph 130 by display a data mark. The selection may also cause graph 130 to be displayed with reduced opacity to avoid visually interfering with added visualizations (e.g., graphs 120(1) and 120(2)).

In this example, the user has previously provided user inputs 40 that select rolling horizon time series information 20(1)-20(2) to display along with associated horizon lengths of 13 time periods and 8 time periods, respectively. In the example of FIG. 5B, the user has also provided user inputs 46 that select a visualization format, referred to as "looking left", that displays the sets of forecasts from the selected rolling horizon time series information 20(1)-20(2) corresponding to the selected realization 132. Accordingly, visualization unit 50 generates visualizations 60 to include a graph 120(1) corresponding to the set of forecasts for time period 19 from time periods 6 through 18 from rolling horizon time series information 20(1) and a graph 120(2) corresponding to the set of forecasts for time period 19 from time periods 11 through 18 from rolling horizon time series information 20(2). Visualization unit 50 causes graphs 120(1) and 120(2) to be displayed adjacent to graph 130.

From the "looking left" visualization format in FIG. 5B, a user may see the forecasts that led up to realization 132 at time period 19. In this example, the user can analyze the forecasts and readily discern that the forecasts from both rolling horizon time series information 20(1) and 20(2) significantly overestimated the number of units that were realized in time period 19.

The user may return to the display shown in FIG. 5A by positioning pointer 140 outside of circle 142 or cause other sets of forecasts for another realization to be displayed by positioning pointer 140 on a different circle 142 corresponding to the selected realization.

Figure 5C:
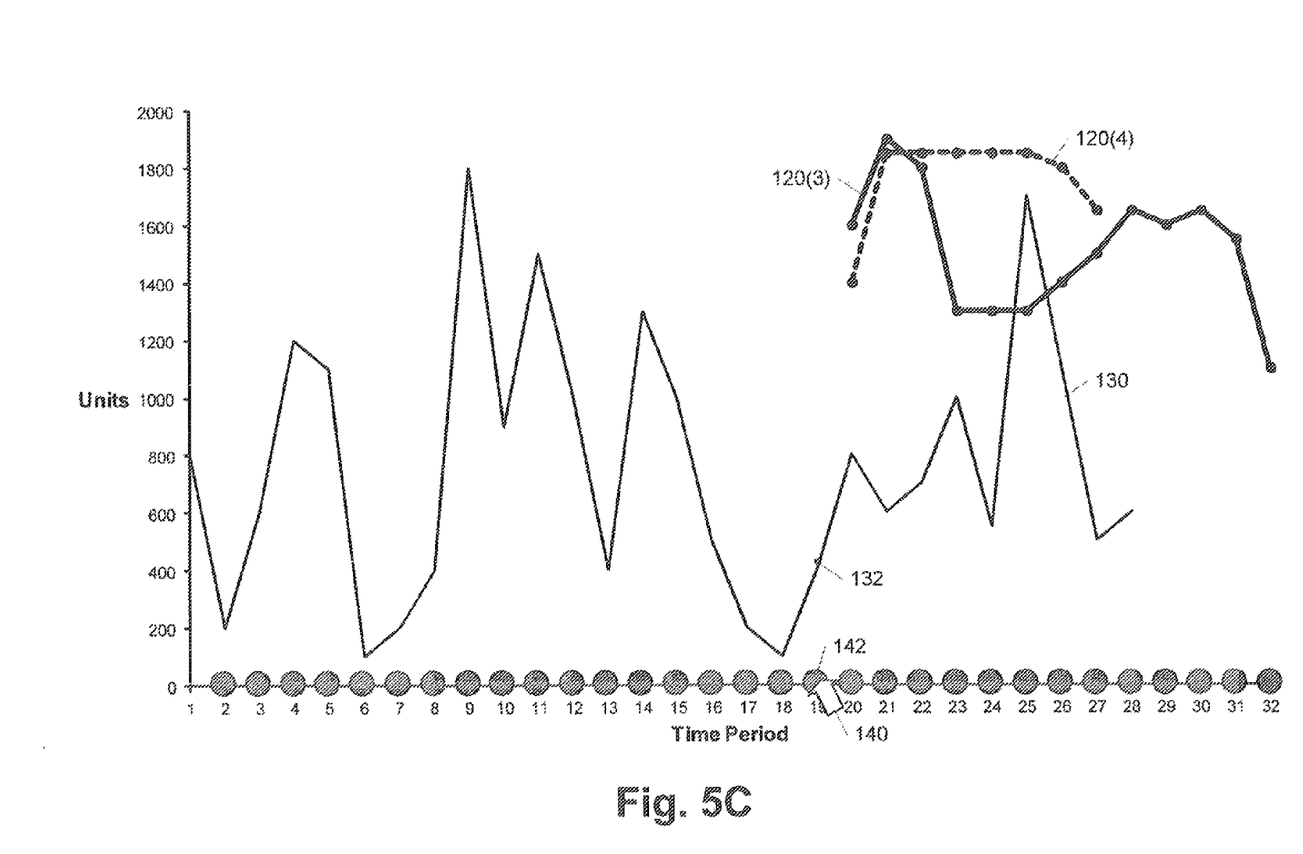

FIG. 5C shows another example where user previously provided user inputs 40 that select rolling horizon time series information 20(3)-20(4) to display along with associated horizon lengths of 13 time periods and 8 time periods, respectively. The user has also provided user inputs 40 that select a visualization format, referred to as "looking right", that displays forecast time series 22 from the selected rolling horizon time series information 20(3)-20(4) corresponding to the selected realization 132 (i.e. forecast time series 22 issued at time 19).

Visualization unit 50 initially generates visualizations 60 to include only graph 130. When the user selects realization 132 corresponding to time period 19 by positioning pointer 140 over the circle 142 near time period 19 on the axis in one embodiment, the selection causes realization 132 to be visually highlighted on graph 130 by display a data mark and may cause the portion of graph 130 to the left of realization 132 to be displayed with reduced opacity to avoid visually interfering with added visualizations (e.g., graphs 120(3) and 120(4)). Visualization unit 50 generates visualizations 60 to include a graph 120(3) corresponding to forecast time series 22 for time period 19 from time periods 20 through 32 from rolling horizon time series information 20(3) and a graph 120(4) corresponding to the forecast time series 22 for time period 19 from time periods 20 through 27 from rolling horizon time series information 20(4). Visualization unit 50 causes graphs 120(3) and 120(4) to be displayed adjacent to graph 130.

From the "looking right" visualization format in FIG. 5C, a user may compare the forecasts issued at time period 19 for the upcoming time periods. In this example, the user can analyze the forecasts and see that the forecasts from rolling horizon time series information 20(3) were above the number of units that were realized in time periods 20-24 and 26-28. The user can also see that the forecast from rolling horizon time series information 20(3) was below the number of units that were realized in time period 25 and that the number of units that were realized is not yet know for periods 28-32. The user can further see that the forecasts from rolling horizon time series information 20(4) were above the number of units that were realized in time periods 20-27.

By positioning pointer 140 outside of circle 142, the user may remove graph 120(3) and graph 120(4), cause the opacity of graph 130 to be returned to full opacity, and causes the visual highlight of realization 132 on graph 130 to be removed. The user may cause other sets of forecast time series 22 for another realization to be displayed by positioning pointer 140 on a different circle 142 corresponding to the selected realization.

FIG. 4B illustrates another embodiment of a method for displaying rolling horizon time series visualizations 60. The method of FIG. 4B assumes that a visualization format, an aggregation level and time granularity of realization time series 32, and a desired set of rolling horizon time series information 20 for visualization with desired horizon lengths have been determined for the visualizations (e.g., from user inputs 40, default settings, and/or other predefined settings).

Visualization unit 50 displays a realization graph for a realization time series 32 as indicated in a block 100. Visualization unit 50 displays the realization graph in accordance with the determined visualization format, the determined aggregation level and time granularity of realization time series 32, and, for "looking right" formats, the determined, horizon lengths. For the "looking left" format, visualization unit 50 may display the realization graph similar to the graph 130 shown in FIG. 5A where x-axis covers all time periods of realization time series 32. For the "looking right" format, visualization unit 50 may display the realization graph similar to the graph 130 shown in FIG. 5A but with additional time periods to the right of the last realization of realization time series 32 to allow forecasts to be displayed for horizon lengths that extend beyond the last realization.

Visualization unit 50 provides an ability to select realizations in the realization graph as indicated in a block 102. As described in the embodiments above, visualization unit 50 may provide this ability by providing a defined area for the user to position a pointer (e.g., a pointer over circles 142 or over points on the realization graph). Visualization unit 50 receives a user input 40 corresponding to a realization on the realization graph as indicated in a block 104. The user input 40 may include the user positioning a pointer over a defined area as illustrated above in FIGS. 5B and 5C.

Visualization unit 50 displays forecast graphs of selected forecast rolling horizon time series information 20 corresponding to the realization as indicated in a block 106. For the "looking left" format, visualization unit 50 displays the forecast graphs to include the set of forecasts in the horizon lengths corresponding to the selected realization as shown in the example of FIG. 5B. Visualization unit 50 may also visually highlight the selected realization and reduce the opacity of the realization graph to minimize any visual interference with the forecast graphs. For the "looking right" format, visualization unit 50 displays the forecast graphs to include forecast time series 22 from the selected rolling horizon time series information 20 that correspond to the selected realization as shown in the example of FIG. 5C. Visualization unit 50 may also visually highlight the selected realization and reduce the opacity of the realization graph to the left of the realization to emphasize the forecast graphs with respect to the relevant portion of the realization graph.

A determination is made by visualization unit 50 as to whether another realization is selected as indicated in a block 108. Prior to another realization being selected, the previous realization may be de-selected by the user moving the pointer out of the defined area. When the de-selection occurs, visualization unit 50 may return the display to the initial display of the realization graph as described above for the "looking left" and "looking right" formats. In particular, visualization unit 50 removes the forecast graphs when a realization is de-selected. When a user selects another realization (e.g., by positioning the pointer over a defined area corresponding to the other realization), visualization unit 50 generates new forecasts graphs corresponding to the realization. In this way, the user can easily and arbitrarily select realizations to cause corresponding forecast graphs to be generated and updated when new realization selections are made.

In the embodiments of FIGS. 4A-4B and 5A-5C, a user selects a single realization from realization time series 32 to cause corresponding information from rolling horizon time series information 20 to be adjacently displayed. A user may also provide a user input 40 that selects portions of one or more selected rolling horizon time series information 20 to be simultaneously displayed for all realizations from realization time series 32. These visualizations 60 are referred to as aggregate visualizations (i.e., aggregate rolling horizon time series visualizations) and are illustrated in FIGS. 6A-6B.

Figure 6A:
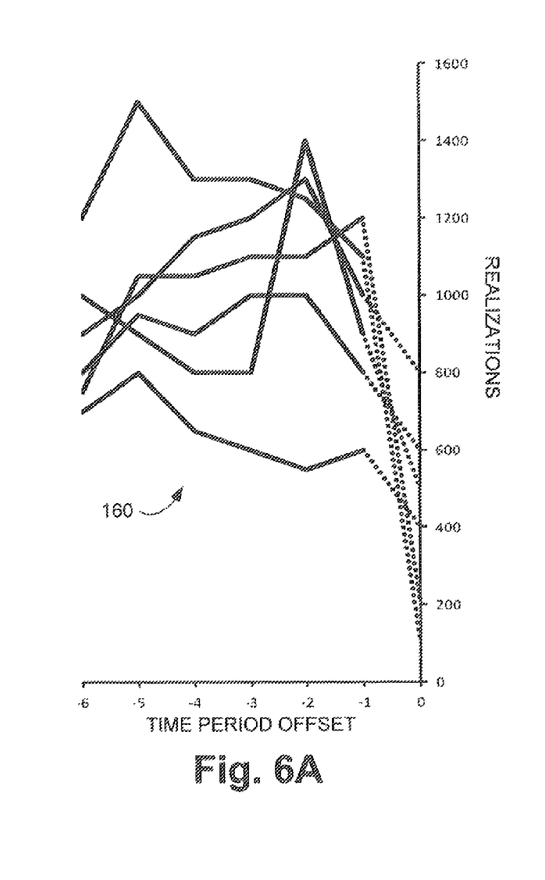
FIGS. 6A-6B are diagrams illustrating embodiments of aggregate rolling horizon time series visualizations.

FIG. 6A illustrates a "looking left" aggregate visualization 160 that parallels the "looking left" visualization format described above. In particular, visualization unit 50 generates visualizations 60 to include a forecast graph for each realization in realization time series 32, where the forecast graphs collectively form aggregate visualization 160. Each forecast graph includes a set of forecasts corresponding to the same time period as a corresponding realization (i.e., a portion of rolling horizon time series 20). Each forecast graph is shown with solid lines with the x-axis representing a time period offset from a corresponding realization (e.g., −2 means the second time period prior to the time period of the realization) and the y-axis representing the units of the realization. A dashed line connects each forecast graph to the corresponding realization on the y-axis. Each realization is graphed along the y-axis at a common point on the x-axis axis.

Aggregate visualization 160 may allow a user to identify general trends that may not be readily apparent in viewing the visualizations corresponding to a single realization. For example, the user may notice a trend towards over-forecasting the realizations in the example of FIG. 6A.

Figure 6B:
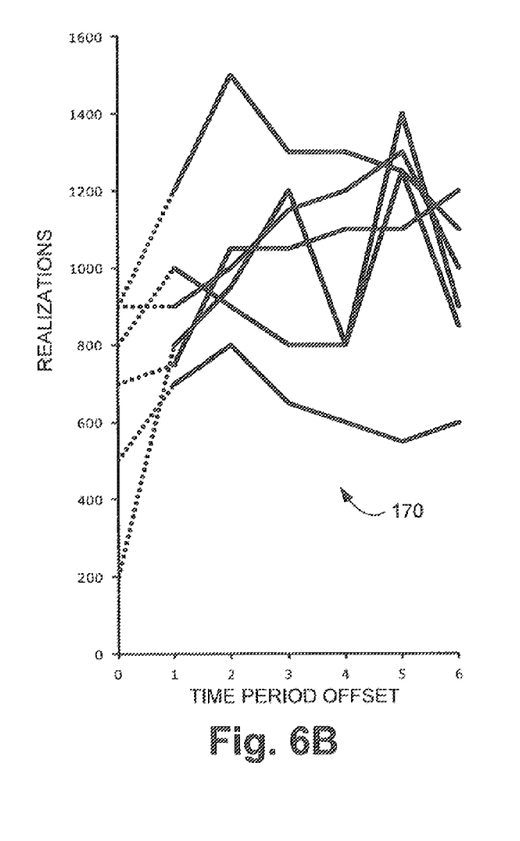

FIG. 6B illustrates a "looking right" aggregate visualization 170 that parallels the "looking left" visualization format described above. In particular, visualization unit 50 generates visualizations 60 to include a forecast graph for each realization in realization time series 32, where the forecast graphs collectively form aggregate visualization 170. Each forecast graph includes a forecast time series 22 issued in the same time period as the corresponding realization (i.e., a portion of rolling horizon time series 20). Thus, each forecast in the forecast time series 22 corresponds to a respective time period after the time period of the corresponding realization. Each forecast graph is shown with solid lines with the x-axis representing a time period offset from a corresponding realization (e.g., 3 means the third time period subsequent to the time period of the realization) and the y-axis representing the units of the realization. A dashed line connects each forecast graph to the corresponding realization on the y-axis. Each realization is graphed along the y-axis at a common point on the x-axis axis.

Aggregate visualization 170 may also allow a user to identify general trends that may not be readily apparent in viewing the visualizations corresponding to a single realization. For example, the user may notice a trend towards over-forecasting the realizations in the example of FIG. 6B.

The above rolling horizon time series visualization methods may advantageously allow a user to interactively analyze rolling horizon time series data. The methods allow the user to focus on desired aggregation levels, time granularity, and horizon lengths and inspect selected portions of the rolling horizon time series data in a simplified manner. The user may examine past revisions of forecasts as well as future-looking forecasts to identify trends within each view. As a result, the user may be able to effectively navigate large and complex data sets.

The visualization methods may find applicability in procurement engagements between a buyer and a seller. For example, the buyer may issue forecast time series for the expected purchase of certain units at various time periods. The seller may use the forecast time series to plan production of the units and may further issue response forecast time series for the expected production levels of the units at various time periods. In such a collaborative inventory management system, the forecast time series and the response forecast time series both form rolling time horizon time series. Accordingly, both the buyer and the seller may benefit by using the above, methods to analyze the forecast time series and the response forecast time series and further communication between the buyer and the seller to result in an enhanced purchasing scheme.

Figure 7:
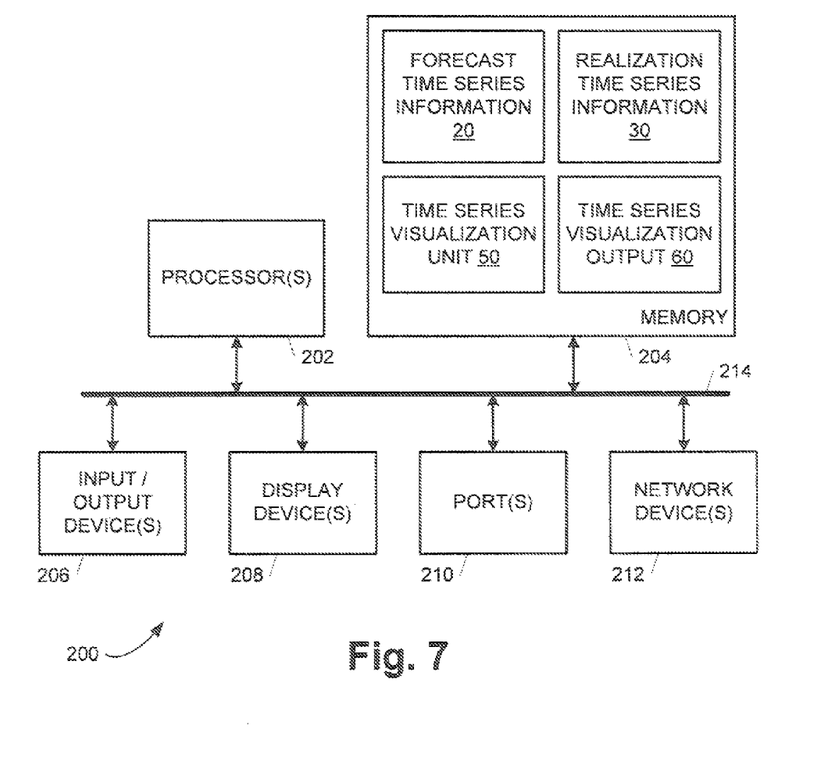
FIG. 7 is a block diagram illustrating a processing system configured to implement a rolling horizon time series visualization environment.

FIG. 7 is a block diagram illustrating a processing system 200 configured to implement rolling horizon time series visualization environment 10 (shown in FIG. 1) to interactively display relationships between rolling horizon time series information 20 and realization time series information 30.

Processing system 200 includes at least one processor 202 configured to execute machine readable instructions stored in a memory system 204. Processing system 200 may also include any suitable number of input/output devices 206, display devices 208, ports 210, and/or network devices 212. Processors 202, memory system 204, input/output devices 206, display devices 208, ports 210, and network devices 212 communicate using a set of interconnections 214 that includes any suitable type, number, and/or configuration of controllers, buses, interfaces, and/or other wired or wireless connections. Components of processing system 200 (for example, processors 202, memory system 204, input/output devices 206, display devices 208, ports 210, network devices 212, and interconnections 212) may be contained in a common housing (not shown) or in any suitable number of separate housings (not shown).

Processing system 200 may execute a basic input output system (BIOS), firmware, an operating system, a runtime execution environment, and/or other services and/or applications stored in memory 204 (not shown) that includes machine readable instructions that are executable by processors 202 to manage the components of processing system 200 and provide a set of functions that allow other programs (e.g., visualization unit 50) to access and use the components.

Processing system 200 represents any suitable processing device, or portion of a processing device, configured to implement the functions of visualization unit 50 as described above. A processing device may be a laptop computer, a tablet computer, a desktop computer, a server, or another suitable type of computer system. A processing device may also be a mobile telephone with processing capabilities (i.e., a smart phone), a digital still and/or video camera, a personal digital assistant (PDA), an audio/video device, or another suitable type of electronic device with processing capabilities. Processing capabilities refer to the ability of a device to execute instructions stored in a memory 204 with at least one processor 202.

Each processor 202 is configured to access and execute instructions stored in memory system 204. Each processor 202 may execute the instructions in conjunction with or in response to information received from input/output devices 206, display devices 208, ports 210, and/or network devices 212. Each processor 202 is also configured to access and store data in memory system 204.

Memory system 204 includes any suitable type, number, and configuration of volatile or non-volatile storage devices configured to store instructions and data. The storage devices of memory system 204 represent computer readable storage media that store computer-readable and computer-executable instructions including visualization unit 50 and computer-readable data such as rolling horizon time series information 20, realization time series information 30, and rolling horizon time series visualizations 60. Memory system 204 stores instructions and data received from processors 202, input/output devices 206, display devices 208, ports 210, and network devices 212. Memory system 204 provides stored instructions and data to processors 202, input/output devices 206, display devices 208, ports 210, and network devices 212.

The instructions are executable by processing system 200 to perform the functions and methods of visualization unit 50 described herein. Examples of storage devices in memory system 204 include hard disk drives, random access memory (RAM), read only memory (ROM), flash memory drives and cards, and other suitable types of magnetic and/or optical disks.

Input/output devices 206 include any suitable type, number, and configuration of input/output devices configured to input instructions and/or data from a user to processing system 200 and output instructions and/or data from processing system 200 to the user. Examples of input/output devices 206 include a touchscreen, buttons, dials, knobs, switches, a keyboard, a mouse, and a touchpad.

Display devices 208 include any suitable type, number, and configuration of display devices configured to output image, textual, and/or graphical information to a user of processing system 200. Examples of display devices 208 include a display screen, a monitor, and a projector.

Ports 210 include suitable type, number, and configuration of ports configured to input instructions and/or data from another device (not shown) to processing system 200 and output instructions and/or data from processing system 200 to another device.

Network devices 212 include any suitable type, number, and/or configuration of network devices configured to allow processing system 200 to communicate across one or more wired or wireless networks (not shown). Network devices 212 may operate according to any suitable networking protocol and/or configuration to allow information to be transmitted by processing system 200 to a network or received by processing system 212 from a network.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope, of the present disclosure be limited by the claims and the equivalents thereof.

What is claimed is:

1. A method comprising:
   detecting, by a system including a processor, a first user input selecting a first realization at a given time period of a realization time series including a plurality of realizations at respective time periods displayed in a first visualization; and
   in response to detecting the first user input, displaying, a second visualization of a first portion of a first rolling horizon time series corresponding to the first realization, the second visualization displayed adjacent to the first visualization.

2. The method of claim 1 wherein the first portion of the first rolling horizon time series includes a set of forecasts corresponding to the first realization.

3. The method of claim 1 wherein the first portion of the first rolling horizon time series includes a forecast time series corresponding to the first realization.

4. The method of claim 3 wherein each forecast in the forecast time series and the first realization correspond to different time periods.

5. The method of claim 1 wherein the first user input includes positioning a pointer over an area in the first visualization that is in proximity to the given time period on an axis corresponding to the first realization.

6. The method of claim 1 wherein the first user input includes positioning a pointer over an area in the first visualization that is in proximity to the first realization on the first visualization.

7. The method of claim 1 further comprising:
subsequent to detecting the first user input, detecting a second user input selecting a second realization at a second time period of the realization time series displayed in the first visualization; and
in response to detecting the second user input, displaying a third visualization of a second portion of the first rolling horizon time series corresponding to the second realization, the third visualization displayed adjacent to the first visualization.

8. The method of claim 1 further comprising:
displaying a third visualization of a portion of a second rolling horizon time series corresponding to the first realization adjacent to the first visualization in response to detecting the first user input.

9. The method of claim 1 wherein the second visualization includes forecast data values for a variable at respective time periods that are prior to the given time period but not after the given time period, and wherein the first realization is a realized value of the variable.

10. The method of claim 1 wherein the second visualization includes forecast data values for a variable at respective time periods that are after the given time period but not prior to the given time period, and wherein the first realization is a realized value of the variable.

11. The method of claim 1 further comprising visually highlighting the first realization in the first visualization in response to the first user input.

12. The method of claim 1 wherein the first rolling horizon time series includes a plurality of forecast time series, each of the plurality of forecast time series including a particular number of time periods, and wherein the first rolling horizon time series has a number of time periods that is greater than the particular number of time periods.

13. The method of claim 1 further comprising:
displaying a further visualization including different portions of a rolling horizon time series for respective realizations at corresponding time periods in the realization time series, where each of the realizations is graphed along a first axis at a common point on a second axis, and each of the different portions of the rolling horizon time series is represented by respective graphs along the second axis that represents corresponding time offsets from a respective time period of each corresponding realization.

14. A non-transitory computer-readable storage medium storing instructions that, when executed cause a processing system to:
provide a user interface that allows a user to select a realization at a given time period of a realization time series including a plurality of realizations at respective time periods displayed as a first graph; and
in response to detecting the selecting of the realization, display a portion of a first forecast rolling horizon time series corresponding to the realization as a second graph adjacent to the first graph in the user interface.

15. The non-transitory computer-readable storage medium of claim 14 further storing instructions that, when executed cause the processing system to:
display the first graph of the realization time series in the user interface in accordance with an aggregation level of the realization time series selected by the user.

16. The non-transitory computer-readable storage medium of claim 14 further storing instructions that, when executed cause the processing system to:
display the first graph of the realization time series in the user interface in accordance with a time granularity of the realization time series selected by the user.

17. The non-transitory computer-readable storage medium of claim 14 further storing instructions that, when executed cause the processing system to:
display the portion of the first forecast rolling horizon time series in the user interface as the second graph in accordance with a horizon length selected by the user.

18. The non-transitory computer-readable storage medium of claim 14 further storing instructions that, when executed cause the processing system to:
display a portion of a second forecast rolling horizon time series corresponding to the realization as a third graph adjacent to the first graph in the user interface.

19. The non-transitory computer-readable storage medium of claim 14 wherein the second graph includes forecast data values for a variable at respective time periods that are prior to the given time period but not after the given time period, and wherein the realization is a realized value of the variable.

20. The non-transitory computer-readable storage medium of claim 14 wherein the second graph includes forecast data values for a variable at respective time periods that are after the given time period but not prior to the given time period, and wherein the realization is a realized value of the variable.

21. A system comprising:
at least one processor to:
display a visualization including different portions of a rolling horizon time series for respective realizations at corresponding time periods in a realization time series, where each of the realizations is graphed along a first axis at a common point on a second axis, and the different portions of the rolling horizon time series are represented by respective graphs along the second axis that represents corresponding time offsets from a respective time period of each corresponding realization.

22. The system of claim 21 wherein each of the different portions of the rolling horizon time series includes a respective set of forecasts corresponding to a respective one of the realizations.

23. The system of claim 21 wherein each of the different portions of the rolling horizon time series includes a forecast time series corresponding to a respective one of the realizations.

* * * * *

UNITED STATES PATENT AND TRADEMARK OFFICE
CERTIFICATE OF CORRECTION

PATENT NO. : 9,195,951 B2
APPLICATION NO. : 13/284570
DATED : November 24, 2015
INVENTOR(S) : Aydin et al.

Page 1 of 1

It is certified that error appears in the above-identified patent and that said Letters Patent is hereby corrected as shown below:

In the claims,

In column 10, line 54, in Claim 1, delete "displaying," and insert -- displaying, by the system, --, therefor.

Signed and Sealed this
Twenty-ninth Day of March, 2016

Michelle K. Lee
*Director of the United States Patent and Trademark Office*